United States Patent
Ren

(10) Patent No.: US 10,554,738 B1
(45) Date of Patent: Feb. 4, 2020

(54) METHODS AND APPARATUS FOR LOAD BALANCE OPTIMIZATION BASED ON MACHINE LEARNING

(71) Applicant: Syncsort Incorporated, Pearl River, NY (US)

(72) Inventor: Hui "Theresa" Ren, Park Ridge, NJ (US)

(73) Assignee: Syncsort Incorporated, Pearl River, NY (US)

(*) Notice: Subject to any disclaimer, the term of this patent is extended or adjusted under 35 U.S.C. 154(b) by 167 days.

(21) Appl. No.: 15/910,760

(22) Filed: Mar. 2, 2018

(51) Int. Cl.
| | | |
|---|---|---|
| G06F 9/46 | (2006.01) |
| H04L 29/08 | (2006.01) |
| G06F 11/34 | (2006.01) |
| G06F 9/48 | (2006.01) |
| G06F 9/50 | (2006.01) |
| G06N 20/00 | (2019.01) |

(52) U.S. Cl.
CPC ........ *H04L 67/1008* (2013.01); *G06F 9/4818* (2013.01); *G06F 9/505* (2013.01); *G06F 11/3414* (2013.01); *G06F 11/3433* (2013.01); *G06N 20/00* (2019.01)

(58) Field of Classification Search
None
See application file for complete search history.

*Primary Examiner* — Gregory A Kessler
(74) *Attorney, Agent, or Firm* — Cooley LLP

(57) ABSTRACT

An apparatus includes a processor, an operating system executed by the processor, and a memory storing code executed by the processor to receive performance data from the operating system and from other compute devices. The apparatus includes a machine learning model trained with the performance data. The apparatus uses the machine learning model to predict workload values of the apparatus and other compute devices. The workload values are predicted for a future time window. The apparatus commands an execution of a data transformation task of a first dataset, based on the predicted workload values and criteria to reduce time consumed in the execution of the data transformation task. Thereafter, the apparatus receives a notification signal indicative of a completion of the data transformation task, and an indicator associated with a second dataset different from the first dataset, produced from the execution of the data transformation task.

20 Claims, 8 Drawing Sheets

US 10,554,738 B1

METHODS AND APPARATUS FOR LOAD BALANCE OPTIMIZATION BASED ON MACHINE LEARNING

FIELD

At least one embodiment described herein relates generally to balancing workloads between two or more compute devices.

BACKGROUND

Mainframes serve a high number of users, typically processing thousands of transactions every second while maintaining centralized terabyte-size data. Mainframes can implement load-balancing techniques including offloading tasks to supporting compute devices. Some technical challenges for the implementation of load-balancing techniques in mainframe environments include adequate optimization of data processing speed, scalability, management of memory, and efficient use of computational resources. These challenges make offloading decisions non-deterministic. Sometimes it can be efficient to offload a task to a supporting compute device while other times it may be better to execute the task locally at the mainframe.

Therefore, a need exists for systems to implement efficient load-balancing techniques based on emergent properties of a mainframe environment.

SUMMARY

At least one embodiment described herein addresses the need to balance workload among a set of compute devices based on predicted workload values for a time window. In some embodiments, an apparatus includes a processor, an operating system executed by the processor, and a memory storing code executed by the processor to receive performance data from the operating system and from other compute devices. The apparatus includes a load balance model trained with received performance data. The apparatus uses the load balance model to predict workload values of the apparatus and other compute devices. The workload values are predicted for a future time window. The apparatus commands an execution of a data transformation task of a first dataset, based on the predicted workload values and criteria to reduce time consumed in the data transformation task. Thereafter, the apparatus receives a notification signal indicative of a completion of the transformation task, and an indicator associated with a second dataset different from the first dataset, produced from the execution of the data transformation task.

DETAILED DESCRIPTION

Figure 1:
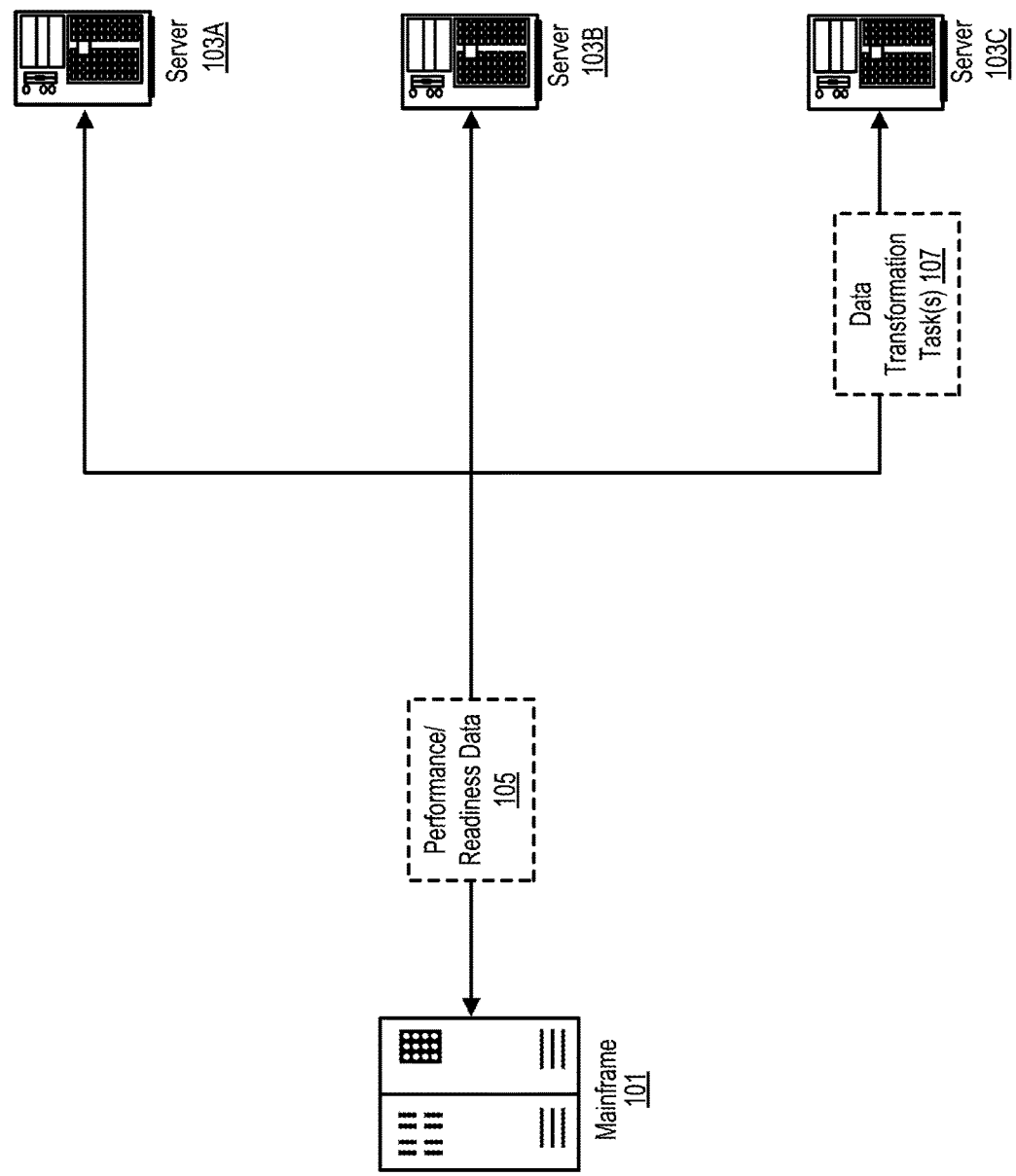
FIG. 1 is a schematic diagram of mainframe environment with an implementation of a system for load balance optimization, according to an embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

The terms "computer", "processor", "computer processor", "compute device", "processing unit", "central processor", or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), or any other electronic computing device comprising one or more processors of any kind, or any combination thereof.

As used herein, the phrase "for example," "such as", "for instance" and variants thereof describe non-limiting embodiments of the presently disclosed subject matter. Reference in the specification to "for example," "such as", "for instance" or variants thereof means that a particular feature, structure or characteristic described in connection with the embodiment(s) is included in at least one embodiment of the presently-disclosed subject matter. Thus the appearance of the phrase "for example," "such as", "for instance" or variants thereof does not necessarily refer to the same embodiment(s).

It is appreciated that, unless specifically stated otherwise, certain features of the presently-disclosed subject matter, which are, for clarity, described in the context of separate embodiments, may also be provided in combination in a single embodiment. Conversely, various features of the presently-disclosed subject matter, which are, for brevity, described in the context of a single embodiment, can also be provided separately or in any suitable sub-combination.

It is not trivial to decide whether a task can be executed more efficiently at a mainframe or at a supporting compute device. Several factors make this decision non-deterministic, including priority of tasks, priority of an application requesting a task, availability of computational resources, expected processing time, expected completion time, among other factors and/or properties of a mainframe environment.

In some instances, offloading a task to a supporting compute device can relieve a mainframe from locally loading data transformation operations, data integration operations, and/or other data intensive operations. Instances exist, however, when one or more supporting compute devices are handling an abnormally high number of processing requests, in such cases; offloading a task can adversely impact the performance of a mainframe environment. Thus, hardcoded conditional statements specifying the logic of a decision to offload (or not) a given task to a dedicated or supporting compute device do not necessarily lead to the most efficient outcome because hardcoded conditional statements can ignore emergent properties arising over time from the interactions of compute devices included within complex mainframe environments.

At least one embodiment described herein includes a load balance model based on a machine learning model trained with performance data from a mainframe and/or supporting compute devices. At least one embodiment described herein includes load balance model based on a rule-based reaction system including a knowledge base with rules elicited from computing characteristics of compute devices included in a mainframe environment. The load balance model is part of an optimized load balance system described herein.

While described in the context of a mainframe environment including multiple supporting or secondary compute devices, the subject matter is not to be so limited. Rather, it will be appreciated that the concepts described hereinafter may be applicable to other complex systems where optimized load balance between two or more compute devices is desired.

An example of an implementation of a system with a load balance optimizer is discussed with reference to FIG. 1. As shown in FIG. 1, mainframe 101 can be communicatively coupled to one or more supporting compute devices. More specifically, mainframe 101 is communicatively coupled to server 103A, server 103B, and server 103C. Mainframe 101 can receive performance/readiness data 105 sampled during execution of a data transformation task, data indicating server resources capacity, readiness data, and/or identifier of a data transformation task that being executed by server 103A, 103B, and/or 103C, and identifier of a data transformation task in queue to be executed by server 103A, 103B, and/or 103C and/or other suitable data from each of the servers 103A, 103B, and 103C.

In some implementations, mainframe 101 can produce a training set from data 105 received to train a load balance model configured to predict workload values for a future time window for each of the servers 103A, 103B, and 103C. Likewise, mainframe 101 can produce a training set from performance data sampled from mainframe resources while the mainframe executes a data transformation task. Likewise, mainframe 101 can use data received at 105 to determine whether a data transformation task executed or on queue for execution by server 103A, 103B, and/or 103C is a critical (e.g., a data transformation task required to be executed at the earliest possible time) or a prioritized data transformation task.

In some implementations, mainframe 101 trains the load balance model with the training sets and validates the load balance model according to criteria that can include expected accuracy levels, robustness, levels of generalization, and other suitable load balance model validation criteria. Mainframe 101 can use the load balance model to predict, for example, expected mainframe workload values and/or expected workload values for servers 103A, 103B, and 103C. Mainframe 101 can use the predicted workload values to determine whether a data transformation task should be executed locally at mainframe 101 or if the data transformation task should be offloaded to one of the servers. For example, in FIG. 1, mainframe 101 commands to server 103C the execution of data transformation task 107 because the computational cost resulting from this instance of load distribution is predicted to be more efficient for mainframe 101 if performed at server 103C. In some other implementations, the load balance model can be implemented as a rule-base reaction system with a working memory including assertions or facts gathered from the monitoring of computational resources at mainframe 101 and servers 103A, 103B, and 103C. A more detailed discussion regarding implementations of the load balance model is provided with reference to FIG. 5-FIG. 8.

Figure 2:
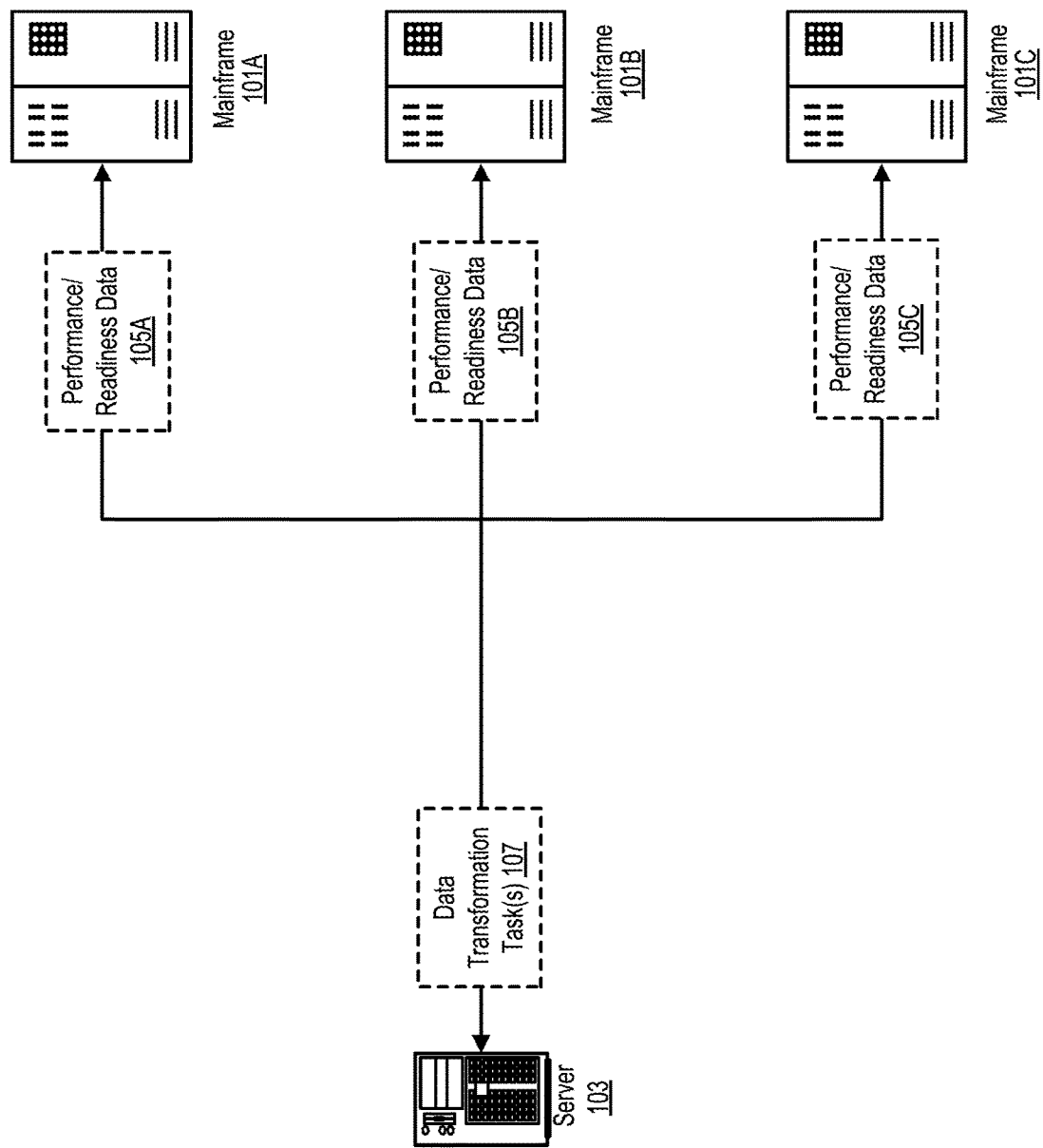
FIG. 2 is a diagram of another mainframe environment with an implementation of a system for load balance optimization, according to an embodiment.

A further example of an implementation of the system with a load balance optimizer is discussed with reference to FIG. 2. As shown in FIG. 2, in some implementations, more than one mainframe can be communicatively coupled to a supporting compute device. For instance, mainframe 101A, mainframe 101B, and mainframe 101C can be communicatively coupled to server 103. In this instance, a load balance model can be implemented in server 103. Accordingly, server 103 can produce a training set based on data sampled from received data transformation tasks 107 and during the execution of such tasks. The training set can include types of received data transformation tasks, time to execute data transformation tasks, priority of received data transformation tasks, identifiers of mainframes requesting data transformation tasks, capacity of server resources during execution of data transformation tasks, rate and time at which data transformation tasks are received, and/or other suitable data. In a similar way as mainframe 101 was discussed with reference to FIG. 1, server 103 can train and validate the load balance model against an evaluation criteria including, for example, expected accuracy levels, robustness, generalization levels, and/or other suitable evaluation criteria. If the load balance model meets the terms of the evaluation criteria then, server 103 can use predicted workload values produced by the trained load balance model to compute readiness values for a future time window. A readiness value indicates a period of time for which server 103 is expected to be ready to execute data transformation tasks.

In some implementations, server 103 can periodically send performance data and readiness data, 105A, 105B, and/or 105C to one or more mainframes e.g., mainframes 101A, 101B, and 101C. Performance data and readiness data 105A, 105B, and 105C can include readiness values for server 103, capacity of computing resources of server 103, and other suitable data. Mainframes 101A, 101B, and 101C can use received performance data and readiness data to determine whether it is efficient to command server 103 to execute a data transformation task. A more detailed discussion regarding the load balance model is provided with references to FIG. 5-FIG. 8.

Multiple variations of the examples discussed with reference to FIG. 1 and FIG. 2 can be implemented. For instance, server 103C in FIG. 1 can simultaneously operate as a supporting compute device for second mainframe (not shown in FIG. 1) in addition to mainframe 101. In such a case, the load balance model at mainframe 101 can receive performance and readiness data 105 indicating, for example, performance data associated with the execution of data transformation tasks received by server 103C from mainframe 101 and the second mainframe. Likewise, mainframe 101A shown in FIG. 2 can be coupled to multiple supporting or secondary compute devices (not shown in FIG. 2) in addition to server 103. Accordingly, mainframe 101A can command offload a data transformation task to either server 103 or to another supporting compute device depending on, for example, their readiness values.

Figure 3:
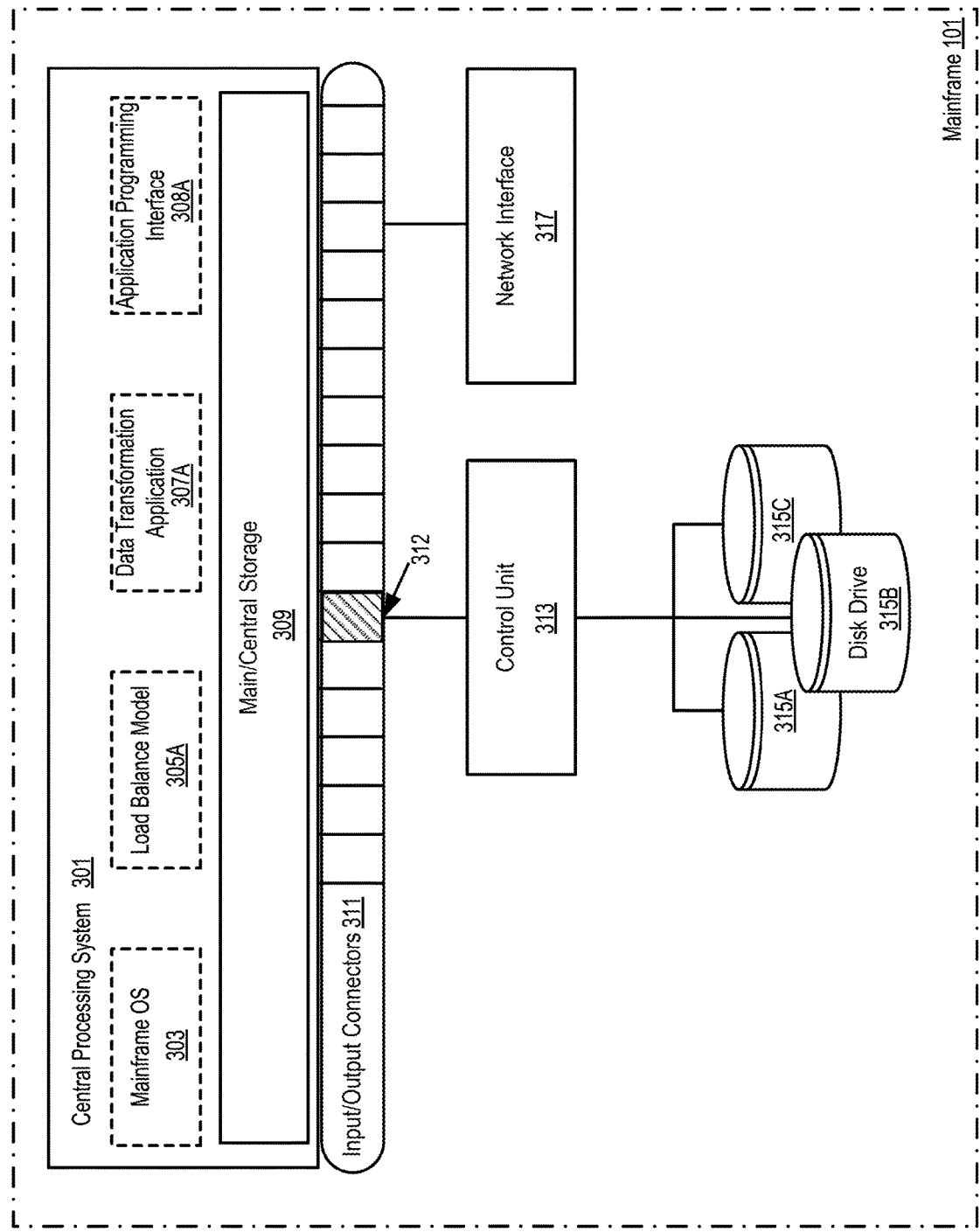
FIG. 3 is a block diagram illustrating a first example of a compute device configuration for an implementation of a system for load balance optimization, according to an embodiment.

An implementation of a compute device configuration for a load balance optimization system based on machine learning is shown in FIG. 3. In some implementations, central processing system 301 includes multiple processing units or central processors (not shown in FIG. 3) specialized for the execution of various high-volume, processing-intensive tasks. Central processing system 301 implements and executes instances of mainframe operating system (OS) 303, load balance model 305A, data transformation application 307, and application programming interface 308A.

Mainframe OS 303 runs programs, manages communications with linked compute devices, and processes complex numerical and data-driven tasks. Mainframe OS 303 executes multiple operations including dispatch of processing tasks to processing units contained in central processing system 301 (e.g., dispatch of data transformation tasks), execution of resource management tasks, monitoring of compute devices, and other suitable operating system tasks. Mainframe 101 can run one or more different types or versions of mainframe OS, including, for example, z/VM®, z/VSE™, Linux for System z®, z/OS®, z/TPF®, and other suitable mainframe OS.

In some implementations, load balance model 305A can be trained to predict workload values for a given window of time. The workload values can be predicted for a specific compute device, for instance, for mainframe 101, for a supporting compute device (e.g., servers 103A, 103B, and 103C), a system integrated information processor (not shown in FIG. 3), and/or other suitable compute devices. In some instances, the predicted workload values can be further associated with a type of data transformation task and/or properties of a dataset or file to be processed by the data transformation task including datatypes in the dataset or file, size of the dataset or file, and/or other suitable properties of a dataset or file. Accordingly, in some instances load balance model 305A can receive as input a window of time or an specific time indicating when a data transformation task should be initiated or completed, a data transformation task, a dataset, a file, a pointer to a dataset, and/or other suitable data structure or value.

Data transformation application 307A executes data transformation tasks locally at mainframe 101. Some examples of data transformation tasks include data format conversion operations, data sorting operations, data summing operations, data averaging operations, data sampling operations, and other suitable types of data transformation tasks. In some instances, when load balance model 305A indicates that is more efficient to process a data transformation task locally at mainframe 101 then data transformation application 307A can execute one or more computations requested by the data transformation task. Such computations can include, for example, reading from, for example disk drive 315B (or other suitable repository) a dataset, memory block, or file requested to be computed (e.g., requested to be sorted) in the data transformation task, and writing the transformed data back into disk drive 315B or (or other suitable repository). In some implementations, the data transformation application 307A can be a standalone application or can be an application built based on applications or tools provided by mainframe OS 303. Thus, the data transformation tasks computed or processed at mainframe 101 can be executed by one or more processing units included in mainframe 101 (processing units not shown in FIG. 3). In some other instances, load balance 305A can indicate that is more efficient to offload a data transformation task to another compute device different from mainframe 101. In such a case, the offloaded data transformation task can be executed by an application that is functionally analogous to data transformation application 307A implemented at a compute device indicated by the load balance model 305A (e.g., data transformation application 307B discussed below with reference to FIG. 4).

Application Programming Interface (API) 308A can provide subroutines, protocols, and/or services to supporting compute devices including servers 103A, 103B, 103C of FIG. 1, integrated information processors, or other suitable compute devices coupled to mainframe 101. Thus, mainframe 101 can send instructions to execute an offloaded data transformation task to other compute device via API 308A. The API 308A can include a library of subroutines for mainframe 101 to offload data transformation tasks, and to receive outputs from data transformation tasks (e.g., a sorted dataset or a pointer to a sorted dataset), receive error codes, and/or status of compute resources sent by supporting compute devices.

In some implementations, main/central storage 309 can be a high-speed physical memory packaged within central processing system 301. In some other implementations, main storage 309 can be a memory separated from central processing system 301. Main storage 309 can include, for example, an array with hot swappable Random Access Memory (RAM) cards. In some other implementations, high speed or RAM memory can be embedded in one or more processing units included in central processing system 301. Main/central storage 309 stores some of the processor-executable instructions and data that central processing system 301 uses at runtime for instance, processor-executable instructions to execute, train and re-train load balance model 305A, execute data transformation application 307, and other suitable process(es). In some implementations, processor-executable instructions can reside in other memories, e.g., memory embedded in processing units included in central processing system 301 or other memory coupled to processor central processing system 301 and/or mainframe 101 not shown in FIG. 3.

Input/output connectors 311 couple central processing system 301 and main/central storage 309 with other compute devices; for instance, control unit 313 is connected to central processing system via input/output connector (or channel) 312. Input/output connectors 311 allow for transmission of data between central processing system 301 and connected compute devices (e.g., control unit 313) according to one or more communication protocols, and perform other suitable data transfer operations. In some implementations, input/output connectors 311 can include, for example, coaxial cables, fiber optic cables, or other suitable transmission channels. In some instances, big data platform systems, distributed file systems, secondary compute devices (e.g., servers 103A, 103B, and 103C shown in FIG. 1) and/or other suitable systems (not shown in FIG. 3) can be coupled to mainframe 101 via input/output connectors 311 and/or via a wired or wireless computer network gateway e.g., via network interface 317. Moreover, mainframe 101 can connect via network interface 317 to communication networks including the Internet, local area networks, a wide area networks, a metropolitan area networks, telephone networks, mobile networks (including for example, Global System Mobile (GSM) communication, General Packet Radio Service (GPRS), Code Division Multiple Access (CDMA)), or other suitable communication network. Communication within such networks can be enabled through any suitable standard e.g., wireless fidelity (WiFi™), 4G™, long-term evolution (LTE™), or other suitable standard.

In some implementations, control unit 313 can include a combination of hardware and software stored in a local memory (not shown in FIG. 3) to provide logical capabilities to operate and control I/O devices. Control unit 313 can adapt I/O devices to standard forms of control provided by a channel or connector. In some implementations, control unit 313 can be housed in a separate hardware. In other implementations, control unit 313 can be physically and logically integrated into an I/O device. Examples of I/O devices include disk drives 315A, 315B, and 315C, tape drives, communication interfaces, printers, and other suitable devices. In some implementations, disk drives 315A, 315B, and/or 315C can be direct-access storage devices (DASD) that provide long-term storage and quick retrieval of large amounts of data. Such disk drives can include magnetically coated disks spinning at high speeds for reading and writing data.

In some instances, disk drives 315A, 315B, and/or 315C can be used by data transformation application 307A to retrieve and input dataset and/or as intermediate storage devices to temporarily store partial outputs during the production of an output or transformed dataset. Likewise, disk drives 315A, 315B, and/or 315C can be used by data transformation task application 307A or other suitable application as output storage devices used to store final outputs.

Figure 4:
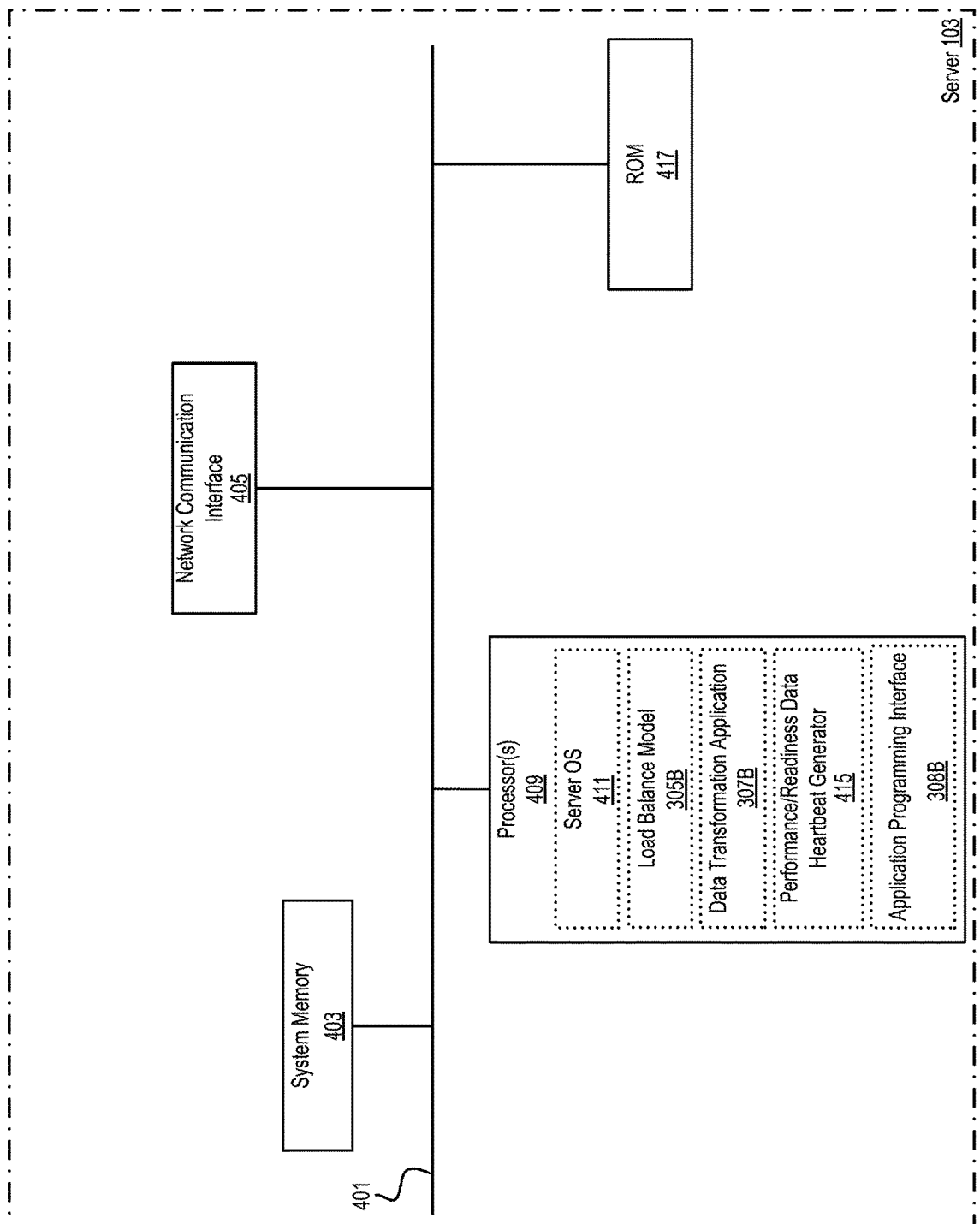
FIG. 4 is a block diagram illustrating a second example of a compute device configuration for an implementation of a system for load balance optimization, according to an embodiment.

A second implementation of a compute device configuration for a load balance optimization system is shown in FIG. 4. Supporting compute device such as server 103 in FIG. 2 can be configured as shown in FIG. 4. Compute device 103 includes a bus 401, processing unit or processor 409 which implements server operating system 411, load balance model 305B, data transformation application 307B, performance/readiness data heartbeat generator 415, and Application Programming Interface (API) 308B. Compute device 103 can likewise include, system memory (RAM) 403, read only memory (ROM) 417, and network communication interface 405.

Bus 401 represents system, peripheral, and/or chipset buses that communicatively couple numerous internal devices of server 103. For instance, bus 401 communicatively couples processor 409 with read-only memory 417, system memory 403, and network communication interface 405. Processor 409 can retrieve instructions (e.g., processor executable code), and data structures to execute the processes of embodiments described herein from memories 403 and/or 417.

Processor 409 can be a single processor, a multi-core processor, or an arrangement of processors in different implementations. In some instances, processor 409 can be any suitable processor, for example, a general-purpose processor, a graphics processing unit (GPU), a field programmable gate array (FPGA), an application specific integrated circuit (ASIC), a virtual processor, and/or other suitable processing device.

Read-only memory (ROM) 417 stores static data and instructions used by processor 409 and/or other compute devices of server 103. System memory 403 can be a read-and-write memory device. System memory 403 stores processor-executable instructions and data that processor 409 uses at runtime, for instance, processor-executable instructions to execute, train, and re-train load balance model 305B, execute data transformation application 307B, and execute performance/readiness data heartbeat generator 415. In some implementations, processor-executable instructions can reside in other memories, e.g., memory embedded in processor 409 or other memory coupled to processor 409 and/or server 103.

Server operating system 411 includes executable instructions that can be stored at any of the memories 403 and 417. Server operating system 411 can manage host applications (e.g., applications 305B, 307B413, and 415) and monitor resources such as workload of processor 409, current capacity of system memory 403 and ROM memory 417. Server operating system 411 can include real-time performance monitoring tools for the extraction of performance reading of one or more resources included in server 103.

Server 103 can receive, via network communication interface 405 and API 308B requests to execute data transformation tasks, and/or other suitable data sent by, for example, mainframes 101A, 101B, and 101C shown in FIG. 1. In some instances, data transformation tasks can be processed by data transformation application 307B. Data transformation application 307B can be implemented in an analogous way as data transformation application 307A discussed with reference to FIG. 3. Data transformation application 307B can implement a listener service to monitor commands or other messages receive via API 308B at a port of network communication interface 405. In some instances, a command received via API 308B can indicate a request to execute a data transformation task. In such a case, data transformation application 307B executes requested data transformation tasks including data format conversion operations, data sorting operations, data summing operations, data averaging operations, data sampling operations, and other suitable types of data transformation tasks.

Processor 409 can send data signals (via API 308B and network communication interface 405) to mainframes 101A, 101B, and 101C, notifying completion of requested data transformation tasks, errors during the execution of a requested data transformation tasks, and/or a notifying other suitable events captured during the execution of a requested data transformation task.

In some implementations, load balance model 305B predicts a readiness value for server 103. In some instances, a readiness value can indicate, for example, a predicted time window for which server 103 is available to execute a data transformation task. Alternatively or additionally, load balance model 305B, can predict a workload value associated with the execution of data transformation task in an analogous way as discussed with reference to load balance model 305A with reference to FIG. 3. Data transformation application 307B executes data transformation tasks requested by one or more mainframes. In some instances, performance/readiness data heartbeat generator 415 can periodically send a message to one or more mainframes indicating predicted readiness, predicted workload, performance data, and/or other suitable data to one or more mainframes supported by server 103. In some instances, performance/readiness data heartbeat generator 415 can sample data transformation application 307B during the execution of a data transformation task, gathering performance data from server 103 and sending the gathered performance data to the mainframe that requested the executed data transformation task.

In some implementations, load balance models 305A and/or 305B can implement one or more filters used to determine whether a compute device is ready to process a data transformation task. Such filters can be implemented via different artificial intelligence techniques and/or machine learning techniques as discussed, as discussed in FIG. 5 and FIG. 6. A first filter can be implemented based on technical specifications of compute devices including maximum memory capacity, maximum processing speed, maximum communication bandwidth, or other technical characteristics of the compute devices shown, for instance, in mainframe environments such the ones illustrated in FIG. 1 and FIG. 2. Such technical specifications can depend on the design of the hardware and/or software installed in a given compute device. Thus, because in some instances one or more compute devices in a mainframe environment can be constrained by design to execute some data transformation tasks and not others, a first filter can differentiate between those compute devices that by design, are apt to compute a given data transformation task and those that are not.

Load balance models 305A and/or 305B can implement logic that indicates priority orders associated with compute devices in a mainframe environment. For example, load balance 305A at mainframe 101 (shown in FIG. 1) can include a priority order indicating that a preferred compute device to offload a data transformation task is server 103A, followed by server 103B, while server 103C can be the least preferred compute device. Likewise, load balance model 305B at server 103 (shown in FIG. 2) can include an order to prioritize data transformation tasks based on a requestor compute device (e.g., mainframe 101A, mainframe 101B, and/or mainframe 101C). For another example, priority orders included in load balance model 305A, and/or 305B can be agnostic to specific compute devices. Thus, priority orders can be implemented based on the types of applications requesting a data transformation task. In such a case, the order in which compute devices in a mainframe environment execute data transformation tasks can depend on the type of application requesting the task irrespectively of the compute device where such applications are running. Moreover, load balance models 305A and/or 305B can include a list of applications for which their data transformation requests are configured by default to be offloaded, even if the data transformation task has to remain for an expected time in queue at a compute device. For yet another example, load balance models 305A and/or 305B can include a priority order based on how critical a data transformation task is; in such a case, the priority order can be independent of the application and/or compute device requesting the task. It should be understood that the examples of priority orders discussed above need not to be mutually exclusive; priority orders included in balancing models 305A and/or 305B can be a combination or the priority orders discussed above and other suitable priority orders that can optimize the processing of data transformation tasks.

Load balance models 305A and/or 305B can implement logic to further differentiate among candidate compute devices to offload or take over the execution of a given data transformation task. In some instances, differentiation logic can be based on, for example, the threshold size of a dataset or data file configured to be processed in a data transformation task. For example, a threshold indicating a minimum (or maximum) file size can be assigned to each of the compute devices determined to be candidates to compute a given data transformation task. Accordingly, load balance models 305A and/or 305B can implement logic to reduce or minimized contention or provide conflict resolution by, for example, preventing two or more critical data transformation task to compete for the same compute resource(s) when they are configured to process datasets or files of different sizes.

Load balance models 305A and/or 305B can implement logic to determine whether a new data transformation task is a candidate for offloading and/or to be processed locally at a mainframe in a mainframe environment, based on, for example, the application requesting such a data transformation task. For instance, decisions to offload, process locally, and/or postpone the processing of a data transformation task can be based on historical trends and patterns correlated with a time window at which a data transformation task is requested to be processed. For instance, balancing models 305A and/or 305B can include logic indicating what other (if any) data transformation tasks are usually requested the same time window. Accordingly, load balance models 305A and/or 305B can include logic derived on historical data to determine whether a higher priority data transformation task is likely to be requested at the same time window as a new data transformation task.

In some implementations, load balance models 305A and/or 305B can implement logic to minimize or reduce the number of data transformation tasks processed at, for example, mainframe 101 shown in FIG. 1 and mainframes 101A, 101B, and/or 101C shown in FIG. 2. Likewise, load balance models 305A and/or 305B can implement logic to minimize or reduce the number of data transformation tasks processed at integrated information processors at one or more mainframes in a mainframe environment. Additionally or alternatively, load balance models 305A and/or 305B can implement logic to minimize or reduce time of data transformation tasks requested by applications when such applications or data transformation task are part of service-level agreements.

In some implementations, load balance models 305A and/or 305B can determine whether to offload a data transformation task or execute locally a data transformation task based on current workload of one or more compute devices in a mainframe environment. For instance, some data transformation tasks can be processed faster when processed by mainframe 101 while others when processed by a supporting compute device. Determination on whether a data transformation task should be processed at, for example, mainframe 101 or a supporting compute device can depend on the current workloads handled by all the compute devices in a mainframe environment that are candidate to process the data transformation task. Load balance model 305A can compute the current load and capacity of mainframe 101 to determine whether mainframe 101 can process a new data transformation task with no impact (or minimum impact) to other tasks or applications already in execution at mainframe 101 or configured to be executed by mainframe 101. Accordingly, load balance model 305A can compute expected consumption measures of compute resources including time windows on which such compute resources are expected to be consumed while processing the new data transformation task. Likewise, load balance model 305B can compute expected consumption measures along with time windows before accepting a new data transformation task and/or send such expected consumption measure to mainframe 101 such that, mainframe 101 can determine whether to offload or locally compute the new data transformation task.

In some implementations, data transformation tasks can be associated with an amount charged to users or non-person entities (i.e., requestors) requesting data transformation tasks. In such a case, load balance models 305A, and 305B can implement logic to minimize or reduce the amount charged to requestors. For instance, if a new data transformation task is expected to cause the mainframe operating system 303 (shown in FIG. 3) to spike in load in a way that would increase an amount charged to a requestor beyond a predetermined threshold, the new data transformation task can be offloaded to different compute device (e.g., server 103A, 103B and/or 103C in FIG. 1). Load balance model 305A can determine to offload the new data transformation task to a supporting compute device. Thus, in some instances, when maintaining an amount charged or billed to a requestor below or at a predetermined threshold is configured to be a priority, load balance models 305A and/or 305B can assign data transformation tasks to the less expensive compute devices or resources.

In some instances, the amount charged to a requestor can be associated to an application used to process a data transformation task. In such a case, the amounts charged to requestors can be determined based on resources consumed at mainframe 101 or a supporting compute device, depending on processor consumption, data inputs, data outputs, use of storage resources, and other suitable computing resources.

In some other instances, the amount charged to a requestor can be associated to peak usage of, for example, mainframe 101. In such a case, load balance model 305A can offload a new data transformation task to a supporting compute device effectively preventing mainframe 101 from reaching peak usage. Thus, load balance 305A can implement logic to predict when mainframe 101 would reach peak usage and accordingly, offload new data transformation tasks.

Figure 5:
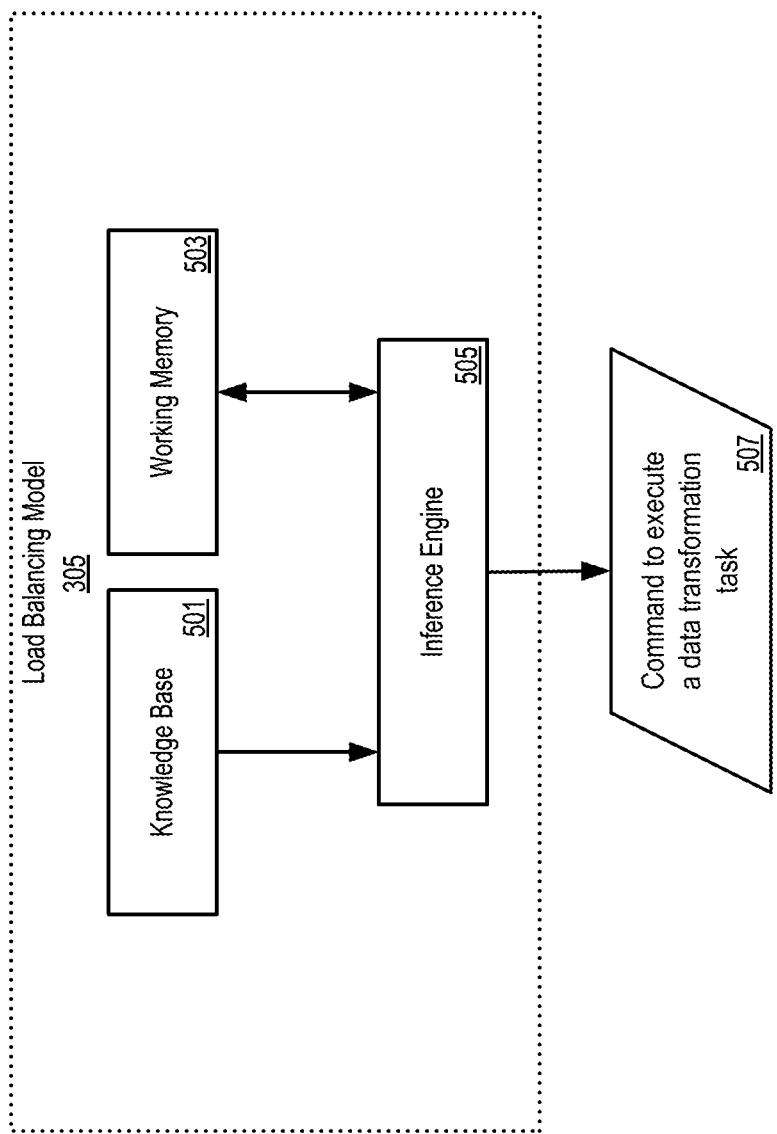
FIG. 5 is a block diagram illustrating a load balance model implemented as a rule-based reaction system to produce decisions to offload or locally process a task at a compute device or mainframe, according to an embodiment.

Examples of two implementations of load balance models 305A and 305B are discussed below with reference to FIG. 5 and FIG. 6. Such load balance models can be implemented with logic extracted or computed from multiple data sources in a mainframe environment. For instance, data from mainframe operating system 303 (FIG. 3) and server operating system 411 (FIG. 4) can be used to produce rules of an inference engine, training, testing and/or validating sets of a machine learning model and other suitable data structures and logic implemented at load balance models discussed with reference to FIG. 5 and FIG. 6. Some examples of data received or derived from operating system 303 and operating system 411 include amount of unused storage or memory, configurations of mainframe 101, and configurations of server 103 (or other suitable supporting compute device), processors and processors' characteristics at mainframe 101 and server 103 including integrated information processors, maximum storage capacity, and other suitable data of mainframe 101, server 103, or other suitable compute device in a mainframe environment. Likewise, historical patterns can be used to implement rules of an inference engine, training, testing, and/or validating sets of a machine learning model. Such historical patterns can include, time series indicating workloads over time of mainframe 101, server 103, or other suitable compute device in a mainframe environment.

In some implementations, load balance models discussed with reference to FIG. 5 and FIG. 6 can implement logic derived or computed from log files or log entries, for example, log files or entries maintained by a System Management Facility (SMF), a Resource Management Facility (RMF), or other suitable application. A SMF is a mainframe operating system application used for the management of software services with tools for creating, monitoring, managing, and restarting services. A service is a long-lived software object (typically, a daemon) with a name, a clear error boundary, start and stop methods, and dependency relationships to other services on the system. A SMF can support collection of log files from, for example, mainframe operating system 303 indicating mainframe activity. Examples of data that can be computed or derive from SMF data includes activity of input and output devices, network activity, software usage, error conditions, processor utilization, and other suitable operational data.

In some implementations, load balance models discussed with reference to FIG. 5 and FIG. 6 can implement logic derived data and/or computed data collected by a Resource Management Facility (RMF) or other suitable monitoring application. An RMF can monitor data from, for example, mainframe 101 including workload and/or utilization of compute resources at specific time intervals. An RMF can collect data associated, for example, with processing units, input and output devices, resource consumption, activity and performance of groups of memory address space and other suitable workload and resource utilization data.

A first example of an implementation of a load balance model, such as load balance model 305 is discussed with reference to FIG. 5. Load balance model 305 can be implemented as a rule-based system including knowledge base 501, working memory 503, and inference engine 505. As discussed above, in some implementations, load balance model 305 can output decision 507 indicating whether a data transformation task should be executed locally at mainframe 101 (shown in FIG. 1), or sent to be executed by another compute device e.g., any of the servers 103A, 103B, 103C (also shown in FIG. 1), a system integrated information processor, or other suitable compute device coupled to mainframe 101.

Knowledge base 501 includes a set of rules implemented from information regarding, for example, computation power of mainframe 101, servers 103A, 103B, 103C, system integrated information processors or other suitable compute device coupled to mainframe 101. Rules in knowledge base 501 can follow an IF (ANTECEDENT) THEN (CONSEQUENT) pattern. A rule can have multiple antecedents and multiple consequents. Differently stated, rules include different and/or distinct IF patterns and THEN patterns. Antecedents or IF patterns can match one or more assertions or facts in a collection of assertions or facts stored at, for example, working memory 503. For example, rule antecedents can include: 1) whether a data transformation task is critical or not; 2) whether a current workload of mainframe 101 and/or a compute device coupled to mainframe 101 falls into a range of workload values corresponding to a given ordinal value (e.g., low, medium, or high); 3) whether a data transformation task requires processing a file below or above a predetermined threshold size; 4) whether an application requesting a data transformation task is a prioritized application; 5) whether mainframe 101 or other compute device coupled to mainframe 101 has the minimum storage capacity required to execute a requested data transformation task; 6) whether the requested data transformation task can be postponed; and/or other suitable antecedents. For another example, rule antecedents can include: (1) amount of memory unused by the compute devices in a mainframe environment, (2) processor characteristics of compute devices in a mainframe environment including clock speed, host-bus speed, processor cache memory size, and/or other processor-specific characteristics, and (3) historical workload patterns of compute devices included in a mainframe environment and other suitable characteristics or patterns of such compute devices.

Working memory 503 stores case specific data that can be used by inference engine 505 to produce further facts and/or command an action. For instance, working memory 503 can include technical specifications of mainframe 101 or other compute devices coupled to mainframe 101 including processing capacity, storage capacity, communication bandwidth, and other suitable technical specifications. Working memory 503 can likewise include performance data received from, for example, mainframe OS 303 (shown in FIG. 3), Server OS 411 (shown in FIG. 4) indicating the extent to which resources at mainframe 101 and server 103 are respectively available.

Inference engine 505 locates or track down rules with antecedents matching assertions or facts stored in working memory 503. Accordingly, inference engine 505 triggers rules stored in knowledge base 501 when all the antecedent patterns of such rules are satisfied that is, when the antecedents of such rules match assertions stored at working memory 503. In some instances, when more than one rule can be triggered simultaneously (e.g., more than one rule can be a candidate to be triggered), conflicts among candidate rules can be solved based on weights included in each candidate rule. Weights can be logically related with rule antecedents and/or a weight for a whole rule. In some instances weight-based conflict resolution among candidate rules can result in the triggering of one rule from a set of candidate rules while in some other instances, weight-based conflict resolution among more than one rule can result in an order in which inference engine 505 will trigger a set of candidate rules. For instance, a higher weight can be given to an antecedent of a first rule when such an antecedent denotes a data transformation task that is critical for an application while a lower weight can be given to an antecedent of a second rule when such and antecedent denotes a data transformation task that is not critical for an application. Accordingly, if the first rule and the second rule are triggered, inference engine 505 can execute the rule with the highest weight (e.g., the first rule). When a rule has more than one antecedent, the rule's weight can be assigned as a function of all the antecedents' weights in the rule. In some additionally or alternative embodiments, a rule weight can be a function of a rule consequent or any combination of a rule antecedent and consequent.

Inference engine 505 can fire or execute one or more triggered rules and produce a new assertion; such a new assertion is stored in working memory 503 and can subsequently cause inference engine 505 to trigger a subsequent rule and eventually fire such a subsequent rule. When mutually exclusive rules or more than one rule are triggered, inference engine 505 can decide which rules should be fired based on configured decision logic. Such a decision logic can be based on workload values received from the compute devices in a mainframe environment, including workload values of the mainframe, criteria to improve a value of a performance metric associated with a mainframe environment or other suitable policy. For example, rules can be configured to distribute data transformation tasks among compute devices in a mainframe environment such that, each compute device has an equivalent workload. For another example, rules can be configured to distribute data transformation tasks among compute devices in a mainframe environment such that, the workload at a mainframe is minimized or decreased. For yet, another example, rules can be configured such that a category or type of prioritized data transformation task is always executed before any other competing lower prioritized data transformation task. Thus rules can be logically configured to be executed according to a priority rule order, a weight given to each antecedent pattern of each of the antecedents of mutually exclusive rules (e.g., selecting the rule with the greatest weight to be fired) or other suitable criteria.

A triggered rule can cause load balance model 305 to produce inferences and/or execute actions. For example, the consequent of a fired rule can cause a first compute device to offload a data transformation task (e.g., 507) to a second compute device. For another example, the consequent of a fired rule can cause the first compute device to process a data transformation task locally at the first compute device e.g., at a local GPU or integrated processor unit.

In some implementations, when load balance model 305B shown in FIG. 4 is implemented in a compute device coupled to mainframe 101, for instance server 103, load balance model 305B operates in an analogous way as discussed above. In such a case, knowledge base 501 includes rules with antecedents that are specific to the performance of server 103, and working memory 503 stores assertions or facts of the operation and resources of server 103 provided by, for instance, server OS 411 (shown in FIG. 4). The output 507 can be sent to performance/readiness data heartbeat generator 415 (also shown in FIG. 4) such that, data heartbeat generator 415 sends a message to mainframe 101 with readiness information of server 103.

A second example of an implementation of a load balance model such as load balance model 305A shown in FIG. 3 and load balance model 305B shown in FIG. 4 is discussed with reference to FIG. 6. The training process shown in FIG. 6 can be executed at, for example, mainframe 101 shown in FIG. 1, server 103 shown in FIG. 2 or other suitable compute device. In some implementations, a compute device (e.g., a mainframe, or a server) receives at 601 a training set with time series including a time window identifier and an average workload value of at least one compute device.

A time series can be defined as a sequence of samples ordered in time. A time window can be defined as an interval of time, for example, fifteen minutes, ten minutes, and hour, or other suitable interval. In some instances, time series can include a set of paired values, a first value corresponding to an identifier of a time window, and a second value corresponding to a value calculated from data sampled from a compute device during the execution of a data transformation task. For instance, a time window identifier (e.g., a timestamp) can be paired with averaged workload values sampled from a compute device during a time window associated with the time window identifier. A time series can be a set of paired time window identifiers and average workload values sequenced or ordered based on the time window identifiers e.g., from oldest to earliest or the other way around.

In some implementations, a processing unit in central processing system 301 (shown in FIG. 3) can receive workload values tracked by mainframe OS 303 (also shown in FIG. 3). In some instances, such a processing unit can calculate workload values by monitoring the workload associated with one or more processing units included in central processing system 301. Likewise, mainframe 101 can receive workload values associated with integrated information processors implemented at mainframe 101.

In some implementations, mainframe 101 (shown in FIG. 3) can receive data associated with available memory at main/central storage 309, utilization of input/output connectors 311, paging rates associated with the storage and retrieval of data from secondary storage devices, or other suitable data associated with workload values. As discussed with reference to FIG. 5, mainframe 101 can receive data indicating 1) whether a data transformation task is critical or not; 2) whether a current workload of mainframe 101 and/or a compute device coupled t falls into a range of workload values corresponding to a given ordinal variable (e.g., low, medium, or high); 3) whether a data transformation task requires processing a file below or above a predetermined threshold size; 4) whether an application requesting a data transformation task is a prioritized application; 5) whether mainframe 101 or other compute device coupled to mainframe 101 has the minimum storage capacity required to execute a requested data transformation task; 6) whether the requested data transformation task can be postponed; and/or other suitable characteristics of compute devices in a mainframe environment. Alternatively or additionally, mainframe 101 can stored data associate with compute devices in a mainframe environment including: (1) amount of memory unused by such compute device, (2) processor characteristics of such compute devices including clock speed, host-bus speed, processor cache memory size or other processor-specific characteristics, and/or (3) historical workload patterns of compute devices included in a mainframe environment.

These data can similarly be integrated to a time series and training sets. Thus, in some implementations, training sets can include univariate time series in which only a single variable is sampled at each time (e.g., a processing unit workload value). In other implementations, training sets can include multivariate time series in which two or more variables are sampled at each time interval (e.g., workload value, memory consumption value, paging rate, and/or other suitable data). Accordingly, a load balance model can be trained to predict values associated with a single variable for a given time window, or alternatively the load balance model can be trained to predict values associated with multiple variables for the given time window. In some instances, adding more than one sampled data can result in more reliable predictions regarding expected computing capacity of a given compute device and/or prevent underfitting or overfitting of a load balance model.

In some implementations, when a load balance model is implemented in a compute device such as server 103 (shown in FIG. 4), the received training sets (for instance, received from Server OS 411) can include time series with time window identifiers paired to workload values of, for example, processor 409. As discussed with reference to mainframe 101, the time series in training sets can be univariate and/or multivariate. For instance, other sampled data that can be included in the time series of a training such as, available memory at system memory 403, available memory at ROM memory 417, bandwidth capacity of network communication interface 405, and other suitable performance data associated with server 103.

In some implementations, training sets can include an identifier of the compute device sampled or that was the source of the training set. Likewise, training sets can include an identifier indicating a type of data transformation task executed by a compute device at the time when performance data was sampled from such a compute device. Some examples of data transformation tasks include data format conversion, data sorting, data summing, data averaging, data sampling and other suitable tasks. Accordingly, load balance models 305A (in FIG. 3) and 305B (in FIG. 4) can predict expected workload or performance values for each type of data transformation task included in the training sets before such tasks are deployed for their execution.

Referring back to FIG. 6, a load balance model is trained at 603 with the received training set. In some implementations, the load balance model can be a time series non-linear regression machine learning model such as an autoregressive neural network with one or more hidden layers, support vector machine model, genetic programming based model, nearest neighbor models, or other suitable load balance model. In some other implementations, a load balance model trained at 603 can be a hybrid non-linear machine learning model such as an Autoregressive Integrated Moving Average (ARIMA) model coupled to an artificial neural network model, an ARIMA model coupled to a support vector machine, or other suitable hybrid machine learning model. Although the training operation at 603 is discussed as a supervised training (i.e., training using labeled training sets), in some instances, training operation at 603 can be an unsupervised training. Unsupervised training can be implemented by, for example, using unlabeled data from monitoring server 103, monitoring processing units at mainframe 101, log files, and other unlabeled data that can be, for example, stored in, for example, disk drives 315A, 315B, and/or 315C (FIG. 3) or in any of the memories of server 103.

In some instances, a testing set can be received at 605. The testing set can have a similar structure as the training set received at 601, however, the time series and their respective values are not used on the training of the load balance model at 603. Differently stated, the testing set includes unseen or out-of-sample time series not included in the training set. At 607, the trained load balance model is executed using as input values from the testing set associated with independent variables of the trained load balance model. For instance, an independent variable can be an identifier of a compute device, a time window, or other suitable variable selected from the received training set at 601. Thereafter, the trained load balance model can produce one or more predicted values of dependent variables, for instance, a predicted workload of the compute device and time window given as input to the trained load balance model. The fitness of the trained load balance model can be evaluated at 609. In some implementations, the fitness of the trained load balance model can be based on calculated residual errors, which represent the difference between actual values extracted from the testing set (expected values) and values predicted by the trained load balance model. In some instances, when it is determined that a trained load balance model has achieved an acceptable fitness level at 609, the training of the load balance model ends. In some other instances, when it is determined that the trained load balance model has not yet achieved an acceptable fitness level then, the training process can continue at 601.

In some instances, when the load balance model has achieved and acceptable fitness level (e.g., at 609) the training process shown in FIG. 6 does not end but rather the load balance model periodically executes a self-assessment to determine if its fitness level has deteriorated below a predetermined fitness level considered acceptable. When the load balance model determines that its fitness level is below such an acceptable fitness level then, the training process shown in FIG. 6 is executed again starting at for example, 601 or 603. Thus, the load balance model can adapt itself to new emergent properties developed over time in a mainframe environment (e.g., mainframe environments shown at FIG. 1 and FIG. 2). Differently stated, the load balance model can produce a command to re-train itself with new or different training and testing sets when it detects or becomes aware that its fitness level has fallen below a predetermined acceptable fitness level.

In some implementations, the training and testing sets can be defined by arbitrary selecting a split point in a superset sampled from a compute device, by splitting such a superset in multiple training and testing sets taking into account the temporal order of such samples, and/or by using such a superset as the training set and subjecting the trained model to fitness validation once a new superset is sampled (i.e., walk-forward validation), or other suitable for back testing load balance models.

Figure 6:
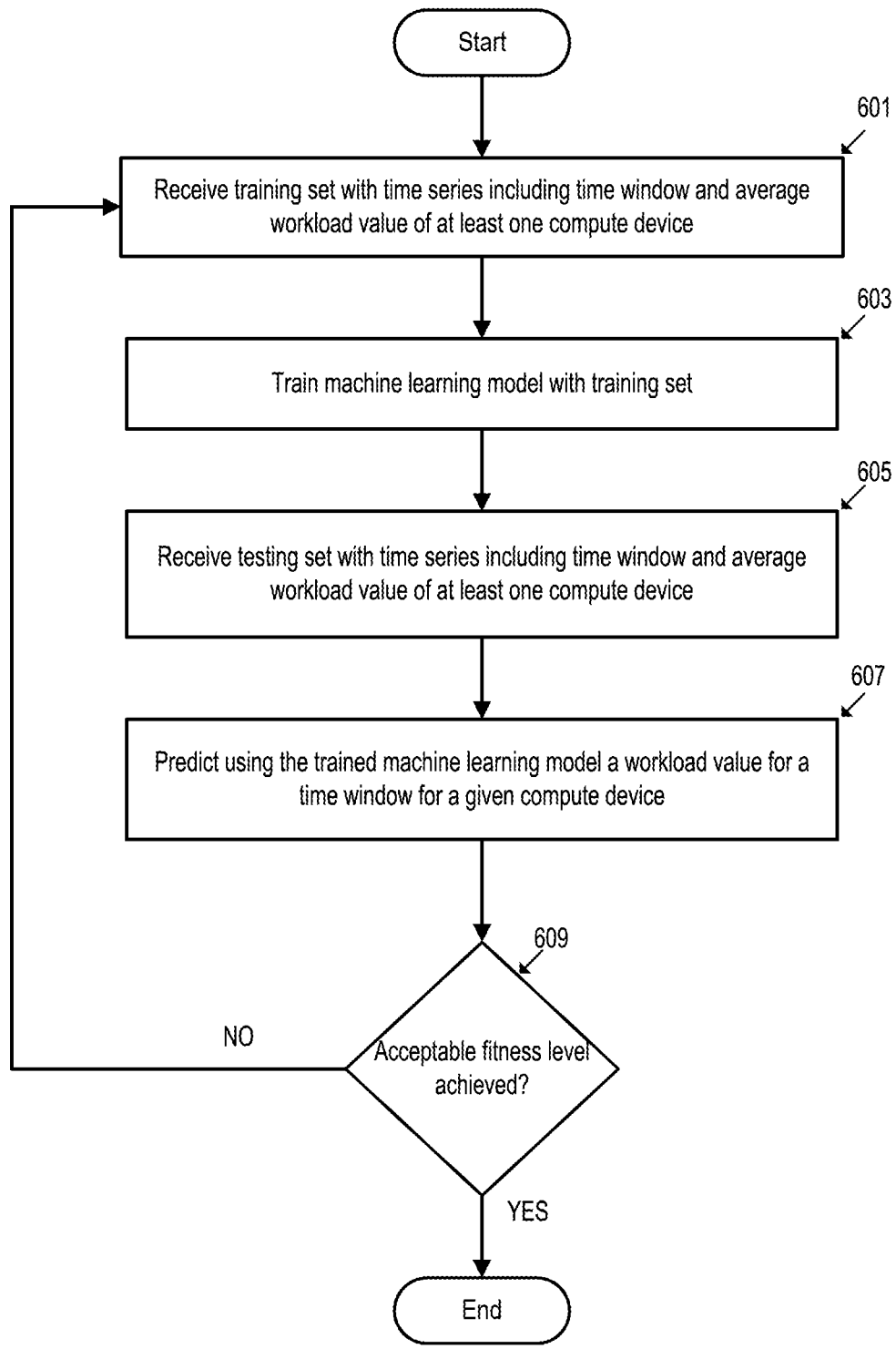
FIG. 6 is a flowchart illustrating a training process of a load balance model to predict workloads of compute devices for a future time window, according to an embodiment.

In some implementations, the load balance model shown at FIG. 6 can implement a backpropagation technique where a final output error (e.g., residual error) is used iteratively to modify data structures comprised by the load balance model. For instance, after calculating a predictive error, the load balance model can assess data structures or nodes and make changes, for examples, weights assigned to one or more nodes of a neural network until a number of right estimates or an acceptable predictive error is achieved.

Figure 7:
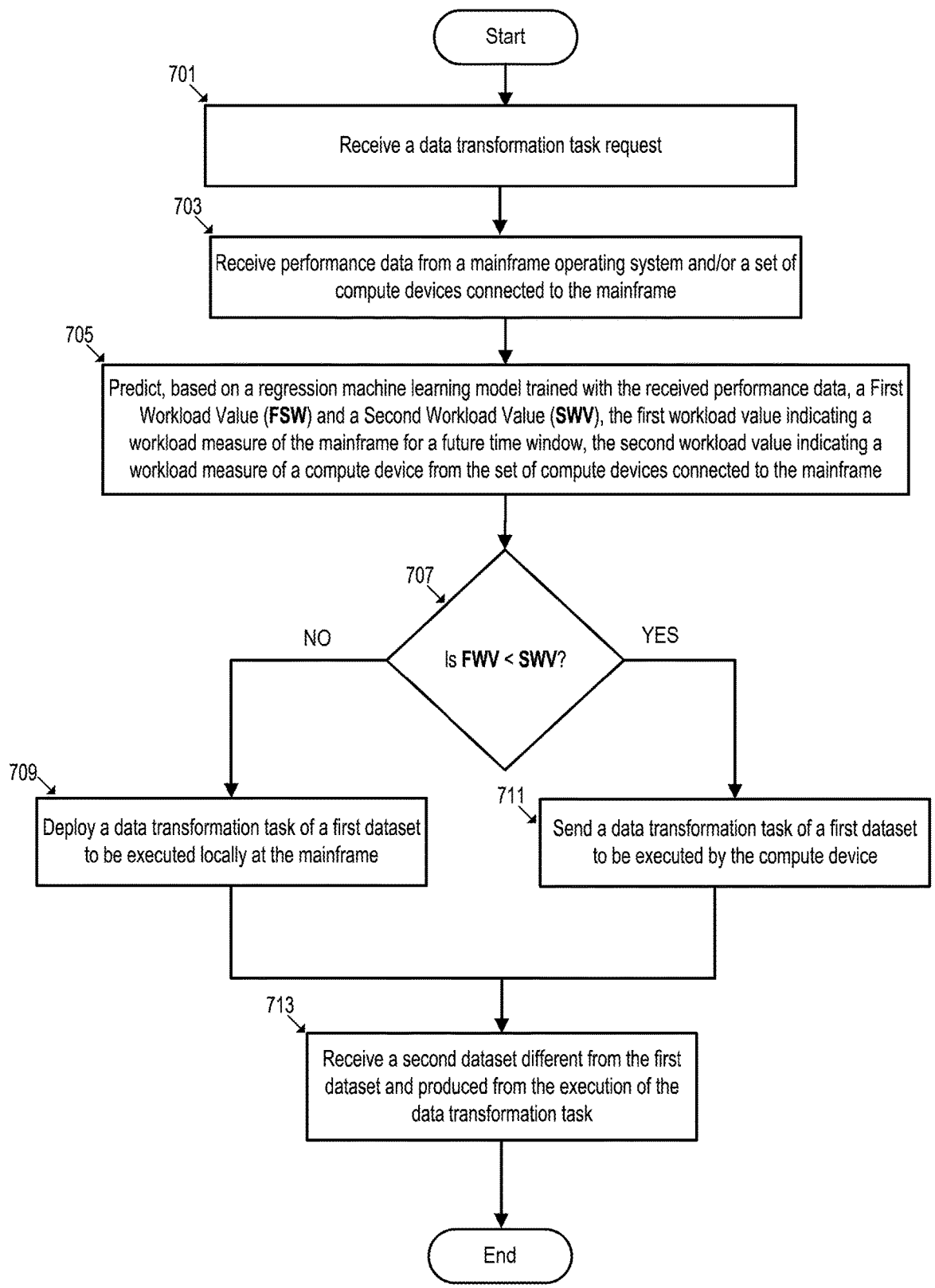
FIG. 7 is a flowchart illustrating an execution of an optimized load balance process based on machine learning, according to an embodiment.

An example of an optimized load balance process based on machine learning is described with reference to FIG. 7. In some implementations, central processing system 301 (shown in FIG. 3) can receive, at 701, a request to execute a data transformation task. Such a request can include one or more parameters and/or data structures. For example, a data transformation task can include a parameter specifying a type of data transformation including a data format conversion, data sorting, data summing, data averaging, data sampling, or other suitable data transformation task. For another example, the data transformation task can include a parameter associated with a dataset containing data to be processed by the data transformation task such as a pointer to a memory address of a storage device at mainframe 101 or an endpoint address to access the dataset at other compute device. Alternatively, a data structure or a file containing such a dataset can be sent as a parameter of the data transformation task.

In some implementations, central processing system 301 (shown in FIG. 3) can receive at 703 performance data from mainframe OS 303 (also shown in FIG. 3), and/or performance data from a set of compute devices coupled to mainframe 101. An example of such set of compute devices includes server 103A, 103B, and 103C shown in FIG. 1, although in other implementations compute devices can be different from a server, for instance a network attached storage device, a direct access storage device, or other suitable compute device.

A regression machine learning model trained as discussed with reference to FIG. 7 can predict at 705 a first workload value (FWV), and a second workload value (SWV) based on received performance data at 703. The FWV can indicate an expected workload measure of mainframe 101 for a future time window. The SWV can indicate an expected workload measure of a compute device (for the same future time) from the set of compute devices connected to the mainframe.

Once at least two workload values for the same future time window are predicted by the regression machine learning model, a compute device is selected for the execution of a data transformation task. For instance, at 707, selection criteria specify that if SWV, (which is associated with a compute device from the set of compute devices) is less than FWV (which is associated with mainframe 101), then mainframe 101 sends to the compute device at 711 a data transformation task and parameters or other data structure for execution at the compute device. Otherwise, mainframe 101 deploys at 709 the data transformation task to be executed locally at the mainframe.

In some instances, the selection criteria can include conditions to select more than one compute device coupled to mainframe 101. For instance, for the example shown in FIG. 1, the regression machine learning model can predict four workload values, one workload value predicted for mainframe 101, and a workload value predicted for each compute device coupled to mainframe 101 (i.e., server 103A, server 103B, server 103C, or other compute device coupled to mainframe 101). In such a case, selection criteria can be configured to select for execution of a data transformation task either mainframe 101, or a server (e.g., 103A, 103B, and 103C) whichever has the smaller predicted workload value. In some other instances, selection criteria can be configured to select two or more compute devices from, for example FIG. 1, to execute in parallel parts of a data transformation task.

In some instances, the selection criteria can evaluate predicted workload values for mainframe 101. Accordingly, depending on a type of data transformation task in queue for execution at mainframe 101 and the mainframe predicted workload value for a future time window, mainframe 101 can determine whether to locally execute a data transformation task or send or offload the data transformation task to another compute device for its execution.

In some implementations, once the data transformation task is executed either by mainframe 101 or a different compute device, mainframe 101 can receive a transformed dataset. In some implementations, mainframe 101 receives the transformed dataset formatted as a file, a data structure or other suitable format. In some other implementations, mainframe 101 can receive a reference to the transformed dataset indicating a memory address or pointer to access the transformed dataset, an endpoint address to access the transformed dataset, or other suitable parameter.

Figure 8:
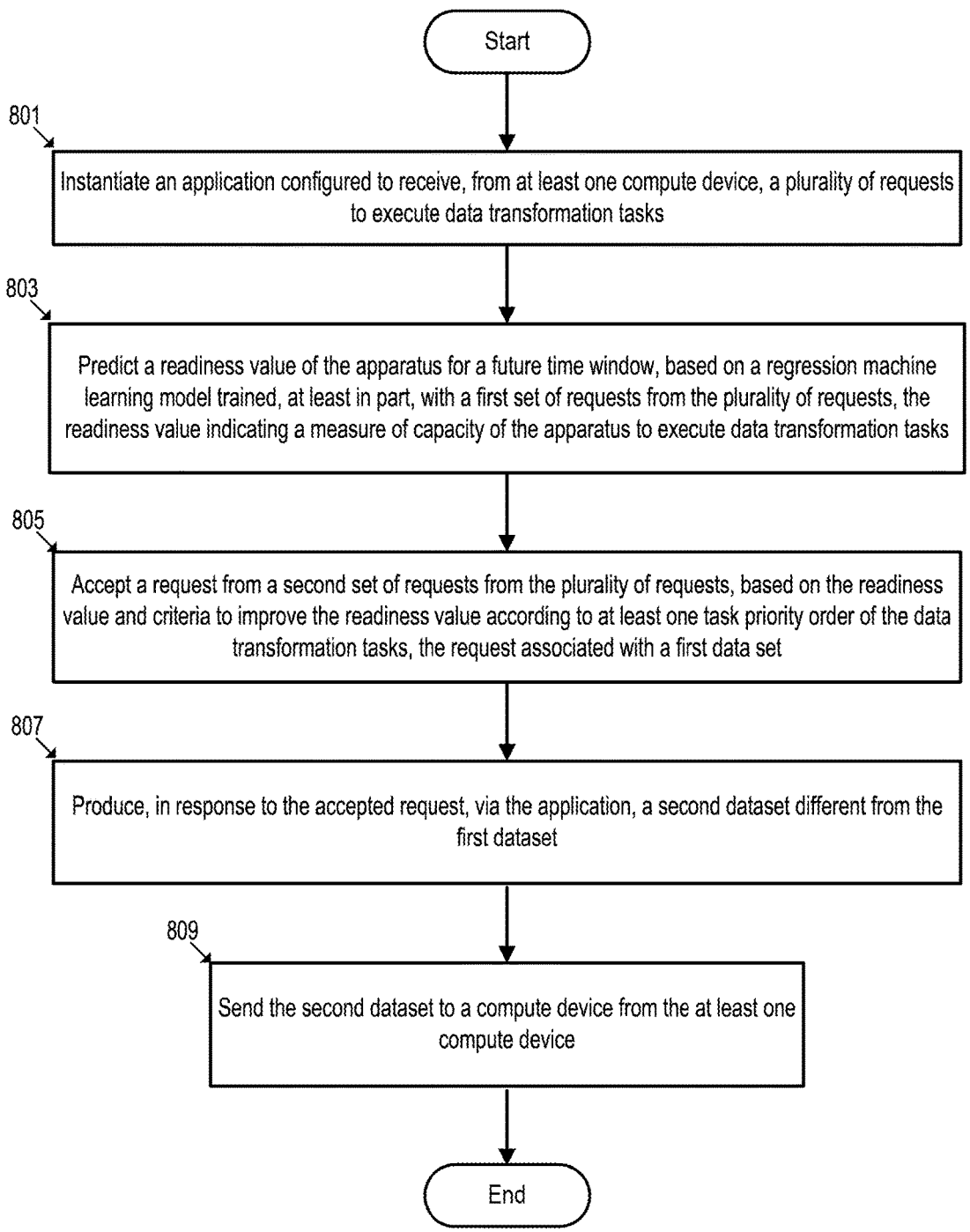
FIG. 8 is a flowchart illustrating an execution of a process to predict a readiness value and execute a data transformation task based, at least in part, on the predicted readiness value, according to an embodiment.

An example of an optimized load balance process based on machine learning is described with reference to FIG. 8. In some implementations, a compute device, for example server 103 in FIG. 2, can instantiate at 801 a data transformation application, for example, data transformation application 307B shown in FIG. 4. In some implementations, data transformation application can be an application dedicated to execute one or more types of data transformation tasks. The data transformation application is configured to receive requests for data transformations tasks and execute such tasks. The requests can be received from, for example mainframe 101. Thereafter, the server 103 can predict at 803, a readiness value for a future time window based on a regression machine learning model trained with, for example, a set of received data transformation tasks. The predicted readiness value indicates an expected capacity of server 103 to execute data transformation tasks during the future time window.

In some implementations, server 103 can periodically send the predicted readiness value to mainframe 101 or to other suitable compute devices, via performance/readiness data heartbeat generator 415 shown in FIG. 4. Thus, mainframe 101 can be informed of the predicted readiness of server 103 before commanding to such server the execution of a data transformation task. In some instances, when for example, a compute device is coupled to set mainframe as shown in FIG. 2, server 103 can send the predicted readiness value to the set of mainframes, for instance, mainframes 101A, 101B, and 101C.

In some implementations, server 103 can receive more than one request to execute a data transformation task. In such a case, server 103 can use an acceptance criteria to select one of the received request over other requests. In some implementations, selection criteria can be based on a priority order given to a set of mainframes coupled to server 103, e.g., mainframe 101A can have the highest priority, while mainframe 101C can have the lowest priority. In some other implementations, selection criteria can be based on priority order given or assigned to the types of data transformation tasks. Accordingly, server 103 accepts, at 805, a request to execute a data transformation task received from a mainframe or other suitable compute device.

As discussed above, data transformation tasks can include datasets requested to be transformed or converted. Server 103 can convert or transformed a first dataset indicated in the accepted data transformation task into a second dataset via data transformation application 307B shown in FIG. 4. Thereafter, server 103 can send, at 809, a reference to access the second dataset (e.g., pointer or endpoint address) to the mainframe that requested the executed task. Alternatively, server 103 can send a file or a data structure with the second dataset to the mainframe that requested the executed task.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The invention claimed is:

1. An apparatus, comprising:
a processor;
an operating system executed by the processor; and
a memory storing code which, when executed by the processor, causes the processors to:
receive, at the processor, performance data from the operating system and a plurality of compute devices;
predict, based on a regression machine learning model trained with the received performance data, a first workload value and a second workload value, the first workload value indicating a workload measure of the apparatus predicted for a future time window, the second workload value indicating a workload measure of a compute device from the plurality of compute devices predicted for the future time window;
command an execution of a data transformation task of a first dataset to one of the apparatus or the compute device, based on (1) criteria to reduce time consumed in the data transformation task, (2) the first workload value, and (3) the second workload value; and
receive a notification signal indicative of a completion of the transformation task, and an indicator associated with a second dataset different from the first dataset and produced from the execution of the data transformation task.

2. The apparatus of claim 1, wherein the code to command the execution of the data transformation task includes code to:
execute the data transformation task at the apparatus when the first workload value is less than the second workload value.

3. The apparatus of claim 1, wherein the code to command the execution of the data transformation task includes code to:
send a command to execute the data transformation task to the compute device when the first workload value is greater or equal to the second workload value.

4. The apparatus of claim 1, wherein the code to command the execution of the data transformation task includes code to:
send a parameter with the data transformation task indicative of a type of data transformation operation to be performed on the first dataset, the parameter indicative of at least one of (1) a data format conversion operation; (2) a data sorting operation; (3) a data summing operation; (4) a data averaging operation; and (5) a data sampling operation.

5. The apparatus of claim 1, wherein the code to command the execution of the data transformation task includes code to:
send a parameter indicating an endpoint address to access the first dataset.

6. The apparatus of claim 1, wherein the indicator associated with the second dataset is an endpoint address to access the second dataset.

7. The apparatus of claim 1, wherein the indicator associated with the second dataset is a file including the second dataset.

8. The apparatus of claim 1, wherein the regression machine learning model is a time series non-linear regression machine learning model trained to predict workload values associated with data transformation tasks.

9. The apparatus of claim 1, wherein the performance data includes performance data from the operating system sampled during execution of a plurality of completed data transformation tasks.

10. An apparatus, comprising:
a processor; and
a memory storing code which, when executed by the processor, causes the processor to:
instantiate an application configured to receive, from at least one compute device, a plurality of requests to execute data transformation tasks;
predict a readiness value of the apparatus for a future time window, based on a regression machine learning model trained, at least in part, with a first set of requests from the plurality of requests, the readiness value indicating a measure of capacity of the apparatus to execute data transformation tasks;
accept a request from a second set of requests from the plurality of requests, based on (1) the readiness value and (2) criteria to improve the readiness value according to at least one task priority order of the data transformation tasks, the request associated with a first dataset;
produce, in response to the accepted request, via the application, a second dataset different from the first dataset; and
send the second dataset to a compute device from the at least one compute device.

11. The apparatus of claim 10, wherein the code further causes the processor to:
send the readiness value to the at least one compute device; and
receive the second set of requests from the plurality of requests in response to the readiness value.

12. The apparatus of claim 10, wherein the code further causes the processor to:
train the regression machine learning model with a training set including workload values sampled from the processor during execution of requested data transformation tasks included in the first set of requests.

13. The apparatus of claim 10, wherein the code further causes the processor to:
train the regression machine learning model with a time series including a time window identifier and an average workload value of the apparatus, sampled from the apparatus during the execution of the first set of requests.

14. The apparatus of claim 10, wherein the code to produce, in response to the accepted request, via the application, a second dataset includes code to:
produce the second dataset within a time period bounded by the future time window.

15. The apparatus of claim 10, wherein the task priority order is based on priorities given to compute devices from the at least one compute device.

16. The apparatus of claim 10, wherein the task priority order is based on priorities given to types of data transformation tasks included in the plurality of requests to execute data transformation tasks.

17. A method, comprising:
receiving, at a processor of a first compute device, performance data from a plurality of compute devices;
triggering a first set of rules, each rule from the first set of rules includes a distinct antecedent pattern satisfied by the performance data received from the plurality of compute devices;
firing a second set of rules, based on criteria to improve a performance metric value of a second compute device from the plurality of compute devices, the second set of rules selected from the first set of rules to produce at least one rule consequent;
determining, based on the at least one rule consequent, a third compute device from the plurality of compute devices for the execution of a data transformation task;
sending a command to the third compute device to execute the data transformation task, the data transformation task associated with a first dataset; and
receiving from the third compute device a second dataset different from the first dataset in response to the command.

18. The method of claim 17, wherein the plurality of compute devices includes a mainframe and the second compute device is the mainframe.

19. The method of claim 17, wherein the distinct antecedent pattern includes one or more of: (1) an amount of memory unused by the third compute device, (2) processor characteristics of the third compute device, and (3) historical workload patterns of the third compute device.

20. The method of claim 17, wherein the distinct antecedent pattern includes data indicative of one or more of: (1) whether the data transformation task is critical, (2) whether a workload value of the third compute device corresponds to an ordinal value, (3) whether the data transformation task requires processing a file of a size that is below a threshold file size, (4) whether an application requesting the data transformation task is a prioritized application, and (6) whether the data transformation task can be postponed.

* * * * *